US008673491B2

(12) United States Patent
Christensen et al.

(10) Patent No.: US 8,673,491 B2
(45) Date of Patent: Mar. 18, 2014

(54) LI-ION BATTERY WITH SELECTIVE MODERATING MATERIAL

(75) Inventors: John F. Christensen, Mountain View, CA (US); Boris Kozinsky, Newton, MA (US); Jasim Ahmed, Mountain View, CA (US); Nalin Chaturvedi, Sunnyvale, CA (US)

(73) Assignee: Robert Bosch GmbH, Stuttgart (DE)

( * ) Notice: Subject to any disclaimer, the term of this patent is extended or adjusted under 35 U.S.C. 154(b) by 343 days.

(21) Appl. No.: 12/437,576

(22) Filed: May 8, 2009

(65) Prior Publication Data

US 2010/0285362 A1 Nov. 11, 2010

(51) Int. Cl.
*H01M 4/24* (2006.01)

(52) U.S. Cl.
USPC ..................... 429/209; 429/231.95

(58) Field of Classification Search
USPC ........................... 429/231.95, 209
See application file for complete search history.

(56) References Cited

U.S. PATENT DOCUMENTS

| | | | |
|---|---|---|---|
| 6,046,575 A | 4/2000 | Demuro | |
| 6,773,616 B1 | 8/2004 | Chen et al. | |
| 7,029,796 B2 | 4/2006 | Choi et al. | |
| 2004/0214091 A1 | 10/2004 | Lim et al. | |
| 2004/0242804 A1 | 12/2004 | Medsker et al. | |
| 2006/0154141 A1 | 7/2006 | Salot et al. | |
| 2006/0216603 A1 | 9/2006 | Choi | |
| 2007/0042267 A1 | 2/2007 | Kim et al. | |
| 2007/0202400 A1 | 8/2007 | Yoshida et al. | |
| 2007/0281214 A1* | 12/2007 | Saruwatari et al. | 429/231.95 |
| 2008/0044732 A1 | 2/2008 | Salot et al. | |
| 2008/0058194 A1 | 3/2008 | Grader et al. | |
| 2008/0248387 A1* | 10/2008 | Hinoki et al. | 429/209 |

OTHER PUBLICATIONS

Christensen, J. and J., Newman, Effect of anode film resistance on the charge/discharge capacity of a lithium-ion battery. Journal of the Electrochemical Society, 2003. 150(11): p. A1416-A1420.
Christensen, J. and J. Newman, Cyclable Lithium and Capacity Loss in Li-Ion Cells. Journal of the Electrochemical Society, 2005. 152(4): p. A818-A829.
Amatucci, G.G. and N. Pereira, Flouride based electrode materials for advanced energy storage devices. Journal of Flourine Chemistry, 2007. 128(4):p. 243-262.
Mikhaylik, Y. Fundamental Chemistry of Sion Power Li/S Battery, in International Battery Association and Hawaii Battery Conference. 2006. Waikoloa, HI.
Wang, J., L. Liu, Z. Ling, J. Yang, C. Wan, and C. Jiang, Polymer lithium cells with sulfur composites as cathode materials. Electrochimica Acta, 2003. 48(13): p. 1861-1867.
Shim, J., K.A. Striebel, and E.J. Cairns, the Lithium/Sulfur Rechargeable Cell. Journal of the Electrochemical Society, 2002. 149: p. A1321.
Doughty, D.H., D.L. Coleman, and M.J. Berry. Abuse Tolerance Studies on Lithium-Sulfur (Li-S) Rechargeable Batteries. in 43rd Power Sources Conference. 2008. Philadelphia, PA.

* cited by examiner

*Primary Examiner* — Tracy Dove
(74) *Attorney, Agent, or Firm* — Maginot, Moore & Beck

(57) ABSTRACT

An electrochemical cell in one embodiment includes a negative electrode including a form of lithium, a positive electrode spaced apart from the negative electrode, a separator positioned between the negative electrode and the positive electrode, and a moderator layer positioned between the negative electrode and the separator.

18 Claims, 1 Drawing Sheet

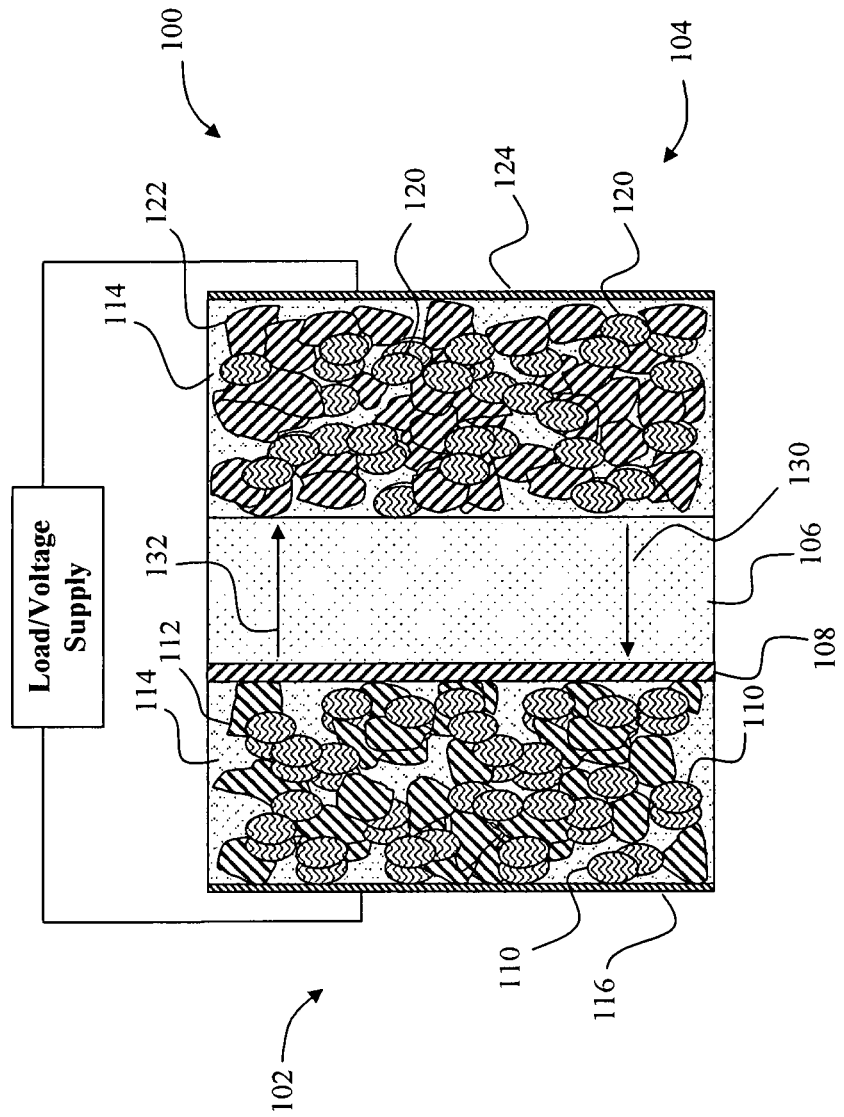

LI-ION BATTERY WITH SELECTIVE MODERATING MATERIAL

Cross-reference is made to U.S. Utility patent application Ser. No. 12/437,592 entitled "Li-ion Battery with Blended Electrode" by John F. Christensen et al., which was filed on May 8, 2009; U.S. Utility patent application Ser. No. 12/437,606 entitled "Li-ion Battery with Variable Volume Reservoir" by John F. Christensen et al., which was filed on May 8, 2009; U.S. Utility patent application Ser. No. 12/437,622 entitled "Li-ion Battery with Over-charge/Over-discharge Failsafe" by John F. Christensen et al., which was filed on May 8, 2009; U.S. Utility patent application Ser. No. 12/437,643 entitled "System and Method for Pressure Determination in a Li-ion Battery" by John F. Christensen et al., which was filed on May 8, 2009; U.S. Utility patent application Ser. No. 12/437,745 entitled "Li-ion Battery with Load Leveler" by John F. Christensen et al., which was filed on May 8, 2009; U.S. Utility patent application Ser. No. 12/437,774 entitled "Li-ion Battery with Anode Coating" by Boris Kozinsky et al., which was filed on May 8, 2009; U.S. Utility patent application Ser. No. 12/437,791 entitled "Li-ion Battery with Anode Expansion Area" by Boris Kozinsky et al., which was filed on May 8, 2009; U.S. Utility patent application Ser. No. 12/437,822 entitled "Li-ion Battery with Porous Silicon Anode" by Boris Kozinsky et al., which was filed on May 8, 2009; U.S. Utility patent application Ser. No. 12/437,873 entitled "Li-ion Battery with Porous Anode Support" by Boris Kozinsky et al., which was filed on May 8, 2009; U.S. Utility patent application Ser. No. 12/463,024 entitled "System and Method for Charging and Discharging a Li-ion Battery" by Nalin Chaturvedi et al., which was filed on May 8, 2009; and U.S. Utility patent application Ser. No. 12/463,092 entitled "System and Method for Charging and Discharging a Li-ion Battery Pack" by Nalin Chaturvedi et al., which was filed on May 8, 2009, the entirety of each of which is incorporated herein by reference. The principles of the present invention may be combined with features disclosed in those patent applications.

FIELD OF THE INVENTION

This invention relates to batteries and more particularly to lithium-ion batteries.

BACKGROUND

Batteries are a useful source of stored energy that can be incorporated into a number of systems. Rechargeable lithium-ion batteries are attractive energy storage systems for portable electronics and electric and hybrid-electric vehicles because of their high specific energy compared to other electrochemical energy storage devices. In particular, batteries with a form of lithium metal incorporated into the negative electrode afford exceptionally high specific energy (in Wh/kg) and energy density (in Wh/L) compared to batteries with conventional carbonaceous negative electrodes.

When high-specific-capacity negative electrodes such as lithium are used in a battery, the maximum benefit of the capacity increase over conventional systems is realized when a high-capacity positive electrode active material is also used. Conventional lithium-intercalating oxides (e.g., $LiCoO_2$, $LiNi_{0.8}Co_{0.15}Al_{0.05}O_2$, $Li_{1.1}Ni_{0.3}Co_{0.3}Mn_{0.3}O_2$) are typically limited to a theoretical capacity of ~280 mAh/g (based on the mass of the lithiated oxide) and a practical capacity of 180 to 250 mAh/g. In comparison, the specific capacity of lithium metal is about 3863 mAh/g. The highest theoretical capacity achievable for a lithium-ion positive electrode is 1168 mAh/g (based on the mass of the lithiated material), which is shared by $Li_2S$ and $Li_2O_2$. Other high-capacity materials including $BiF_3$ (303 mAh/g, lithiated) and $FeF_3$ (712 mAh/g, lithiated) are identified in Amatucci, G. G. and N. Pereira, *Fluoride based electrode materials for advanced energy storage devices*. Journal of Fluorine Chemistry, 2007. 128(4): p. 243-262. All of the foregoing materials, however, react with lithium at a lower voltage compared to conventional oxide positive electrodes, hence limiting the theoretical specific energy. The theoretical specific energies of the foregoing materials, however, are very high (>800 Wh/kg, compared to a maximum of ~500 Wh/kg for a cell with lithium negative and conventional oxide positive electrodes).

Lithium/sulfur (Li/S) batteries are particularly attractive because of the balance between high specific energy (i.e., >350 Wh/kg has been demonstrated), rate capability, and cycle life (>50 cycles). Only lithium/air batteries have a higher theoretical specific energy. Lithium/air batteries, however, have very limited rechargeability and are still considered primary batteries.

While generally safe, the amount of energy stored within a battery as well as the materials used to manufacture the battery can present safety issues under different scenarios. Safety is particularly an issue when a battery is subjected to increased temperatures either as a result of internal processes or as a result of the environment in which the battery is located.

By way of example, when batteries are charged or discharged, they typically generate heat due to a finite internal resistance that includes ohmic, mass-transfer, and kinetic terms. Exothermic side reactions can also generate heat within the battery. This heat generation can pose a safety risk if it is large and rapid. For instance, commercial Li-ion cells generally go into thermal runaway if the internal cell temperature climbs above the decomposition temperature of the cathode (~180 to 220° C., depending upon the chemistry and the state of charge). Often the events that lead to a temperature rise above this critical temperature are triggered at much lower temperatures. For example, exothermic anode film decomposition can occur at ~120° C., providing enough energy to raise the battery temperature above 180° C. Excessive temperature in a battery may leading to venting of gases, smoke, flames, and, in rare cases, explosion.

Undesired amounts of heat may also be generated in a battery due to undesired physical changes in the battery. By way of example, formation of an electronically conducting phase between the two electrodes (i.e., internal shorting) of the battery can lead to excessive internal discharge. Internal shorting may be caused by dendrite formation, separator melting, separator cracking, separator tearing, pinholes, or growth of some conductive material through the separator.

In addition to safety concerns, increased temperatures impact the operational characteristics of the battery. At milder temperatures (40 to 100° C. for Li-ion batteries), aging of the battery is usually accelerated. This is due to the fact that most detrimental side reactions are thermally activated (although not all aging mechanisms in batteries are accelerated at high temperature). It is therefore advisable to cool batteries during operation and/or at high ambient temperatures in order to enhance their cycle and/or calendar life. There are numerous cooling concepts for commercial batteries, including active air cooling, liquid cooling, and the use of materials with high thermal conductivity.

External cooling of batteries, however, does not prevent localized areas of increased heat. For example, batteries that are placed in an ice bath and then heated internally during high current discharge could be maintained at the melting temperature of ice until the ice melts completely, but only at the external surface of the battery. Internally, the temperature of the battery at localized positions would be significantly higher, creating an uneven heat profile. The internal temperature of the battery could thus climb well above the melting temperature of ice.

What is needed therefore is a battery that is less susceptible to the deleterious effects of increased temperature. A further need exists for a battery that exhibits reduced internal self discharge when the separator function is compromised.

SUMMARY

In accordance with one embodiment an electrochemical cell includes a negative electrode including a form of lithium, a positive electrode spaced apart from the negative electrode, a separator positioned between the negative electrode and the positive electrode, and a moderator layer positioned between the negative electrode and the separator.

In accordance with another embodiment, an electrochemical cell includes a negative electrode including a form of lithium, a positive electrode spaced apart from the negative electrode, a separator positioned between the negative electrode and the positive electrode, and a layer of material including $Li_{4+x}Ti_5O_{12}$ and positioned between the negative electrode and the separator.

In accordance with a further embodiment, an electrochemical cell, includes a negative electrode including a form of lithium, a positive electrode spaced apart from the negative electrode, a separator positioned between the negative electrode and the positive electrode, and a moderator layer positioned between the negative electrode and the separator.

BRIEF DESCRIPTION OF THE DRAWINGS

FIG. 1 depicts a schematic of a battery system including an electrochemical cell with a form of lithium in the electrode and a selective moderator layer between the electrode and the separator in accordance with principles of the present invention.

DESCRIPTION

For the purposes of promoting an understanding of the principles of the invention, reference will now be made to the embodiments illustrated in the drawings and described in the following written specification. It is understood that no limitation to the scope of the invention is thereby intended. It is further understood that the present invention includes any alterations and modifications to the illustrated embodiments and includes further applications of the principles of the invention as would normally occur to one skilled in the art to which this invention pertains.

FIG. 1 depicts a lithium-ion cell 100, which includes a negative electrode 102, a positive electrode 104, a separator region 106 between the negative electrode 102 and the positive electrode 104, and a selective moderator layer 108 between the negative electrode 102 and the separator region 106. The negative electrode 102 includes active materials 110 into which lithium can be inserted, inert materials 112, electrolyte 114 and a current collector 116.

The negative electrode 102 of FIG. 1 may be provided in various forms. The negative electrode 102 may incorporate dense Li metal or a conventional porous composite electrode (e.g., graphite particles mixed with binder). Incorporation of Li metal is desired since the Li metal affords a higher specific energy than graphite.

The positive electrode 104 likewise includes active materials 120 into which lithium can be inserted, inert materials 122, the electrolyte 114 and a current collector 124. The separator region 106 includes an electrolyte with a lithium cation and serves as a physical barrier between the negative electrode 102 and the positive electrode 104 so that the electrodes are not electronically connected within the cell 100. The moderator layer 108, in this embodiment, is a relatively thin layer of lithium conducting material.

Under normal conditions, the lithium-ion cell 100 operates in a manner similar to the lithium-ion battery cell disclosed in U.S. patent application Ser. No. 11/477,404, filed on Jun. 28, 2006, the contents of which are herein incorporated in their entirety by reference. In general, electrons are generated at the positive electrode 104 during charging and an equal amount of electrons are consumed at the negative electrode 102 as lithium and electrons move in the direction of the arrow 130 of FIG. 1. In the ideal charging of the cell 100, the electrons are generated at the positive electrode 104 because there is extraction via oxidation of lithium ions from the active material 114 of the positive electrode 104, and the electrons are consumed at the negative electrode 102 because there is reduction of lithium ions into the active material 110 of the negative electrode. During discharging, the reactions are reversed, with lithium and electrons moving in the direction of the arrow 132.

In the event that the separator region 106 is electronically compromised (e.g., through an internal short, dendrite, separator melting, separator cracking, separator tearing, pinholes, etc.), the moderator layer 108 inhibits the flow of lithium and electrons through the separator region 106. More specifically, the moderator layer 108 is formed from a material which under normal battery conditions may act as a lithium and electron conductor, but which acts more like an insulator by preventing good electronic contact between the negative electrode 102 and the positive electrode 104 when the separator region 106 is electronically compromised.

The electronic conductivity of the moderator layer 108 material is related to its charge and discharge potential (V) vs. lithium metal. The charge and discharge potential of $Li_{4+x}Ti_5O_{12}$, which may be a moderator layer 108 material, is approximately 1.5 V over most values of $x > \epsilon$, where $\epsilon$ is approximately 0.1. Accordingly, so long as $x > \epsilon$, the moderator layer 108 conducts both lithium and electrons. Thus, during normal charging and discharging, a flow of electrons and lithium in the direction of the arrows 130 and 132, respectively, occurs.

When $x < \epsilon$, however, the $Li_{4+x}Ti_5O_{12}$ no longer conducts electrons. Accordingly, in the event the separator region 106 is electronically compromised, electrons and lithium will be rapidly withdrawn from the thin titanate layer at the interface of the moderator layer 108 and the separator region 106 in the direction of the arrow 132 until the value of x drops below $\epsilon$ at the interface between the moderator layer 108 and the separator region 106. The reduced electronic conductivity at the interface of the moderator layer 108 and the separator region 106 reduces the internal discharge of the negative electrode 102 to the positive electrode 104.

Internal discharge in this embodiment is not eliminated, however, as lithium from the electrode replaces lithium on the moderator layer 108 at the interface of the moderator layer 108 and the separator region 106. Thus, some internal discharge continues, but at a significantly lesser rate than would occur in the absence of the moderator layer 108. The slower discharge rate provides additional time to remove energy from the cell, such as by external cooling and/or external discharge, to reduce the potential of an internal temperature rise that is rapid enough to send the cell into thermal runaway.

Incorporation of lithium titanate in the moderator layer 108 also provides a readily accessible source of lithium than can be rapidly passed to the separator region 106 in the event of a high discharge pulse. Other forms of lithium may be used in the moderator layer 108 to provide a surge capacity if desired.

While one form of a negative electrode 102/moderator layer 108 is depicted in FIG. 1, the moderator layer 108 may be positioned between the negative electrode 102 and the separator region 106 in a variety of alternative embodiments. Embodiments may include a dense Li negative electrode with a dense lithium titanate moderator layer, a dense Li negative electrode with a porous composite and lithium titanate moderator layer, a porous composite negative electrode with a dense lithium titanate moderator layer, or a porous composite negative electrode with a porous lithium titanate moderator layer.

The manner in which a particular negative electrode 102/moderator layer 108 is manufactured can vary based upon the particular form selected for the negative electrode 102 and moderator layer 108. Lithium titanate, for example, is a ceramic material. Accordingly, the lithium titanate can be integrated as a compact (i.e., nonporous) layer. As a compact layer, however, winding of the cell layers for a wound cell type battery may present challenges. Alternatively, the moderator layer 108 may consist of a porous composite (just as in a conventional electrode) that consists of small lithium titanate particles and binder (e.g., polyvinyl difluoride). The pores in this embodiment may be filled with a Li-cation containing electrolyte (just as in any porous electrode). A porous composite embodiment would not incorporate any electronically conducting material the moderator layer 108, in contrast to what is done for composite lithium-metal-oxide electrodes.

In any event, the moderator layer 108 may be treated as a separate layer and wound or stacked with the other layers of the cell such that it is between the anode and separator. A porous lithium titanate layer, however, typically requires a substrate in order to be handled. For example, conventional porous electrodes are deposited as slurries on a current collector, the solvent of the slurry is removed (leaving pores in place of the solvent), and the composite electrode is "calendared" (compressed with a roll press) to achieve the desired thickness and porosity and to improve particle-to-particle contact. Usually the electrodes are double sided (i.e., with porous electrodes on either side of the current collector).

A porous-composite negative electrode/porous-composite lithium titanate moderator may be obtained by forming the negative electrode in a conventional manner followed by a further deposition of slurry including the lithium titanate on the negative anode. Subsequently, the solvent in the lithium titanate slurry may be evaporated and the formed layers calendared.

A lithium titanate slurry may also be deposited on a dense Li metal, with porosity accomplished by evaporation of the solvent in the lithium titanate slurry. The dense Li metal may be provided in roll form. Alternatively, dense Li metal may be deposited on a current collector via sputtering, vacuum deposition, or any other effective technique.

Formation of a dense lithium titanate moderator layer may be accomplished by processes such as vacuum deposition process or atomic layer deposition. Chemical vapor deposition and sputtering may also be possible.

In alternative embodiments, the moderator layer 108 may include materials other than lithium titanate. By way of example, other material which is an electronic conductor at the potential of lithium, but which is an electronic insulator at higher potentials may also be used, in addition to or in place of lithium titanate, to moderate internal discharging. Additionally, a lithium-conducting material that is intrinsically electronically insulating, independent of lithium content, may be used to reduce internal discharging, although the additional high-rate pulsing capability would not be provided.

While the invention has been illustrated and described in detail in the drawings and foregoing description, the same should be considered as illustrative and not restrictive in character. It is understood that only the preferred embodiments have been presented and that all changes, modifications and further applications that come within the spirit of the invention are desired to be protected.

The invention claimed is:

1. An electrochemical cell, comprising:
a negative electrode including a form of lithium;
a positive electrode spaced apart from the negative electrode;
a separator positioned between the negative electrode and the positive electrode; and
a moderator layer positioned between the negative electrode and the separator, wherein the entire moderator layer is configured to be an electronic conductor at the potential of lithium, but an electronic insulator at higher potentials.

2. The electrochemical cell of claim 1, wherein the moderator layer includes a form of lithium.

3. The electrochemical cell of claim 2, wherein the moderator layer includes $Li_{4+x}Ti_5O_{12}$, wherein X> about 0.1 during normal charge and discharge of the electrochemical cell.

4. The electrochemical cell of claim 1, wherein the positive electrode includes a form of sulfur.

5. The electrochemical cell of claim 4, wherein the moderator layer includes $Li_{4+x}Ti_5O_{12}$, wherein X> about 0.1 during normal charge and discharge of the electrochemical cell.

6. An electrochemical cell, comprising:
a negative electrode including a form of lithium;
a positive electrode spaced apart from the negative electrode;
a separator positioned between the negative electrode and the positive electrode; and
a layer of material consisting essentially of $Li_{4+x}Ti_5O_{12}$ and positioned between the negative electrode and the separator, wherein X> about 0.1 during normal charge and discharge of the electrochemical cell, and the layer of material does not include any non-lithium titanate electronically conducting material.

7. The electrochemical cell of claim 6, wherein the positive electrode includes a form of sulfur.

8. An electrochemical cell, comprising:
a negative electrode including a form of lithium;
a positive electrode spaced apart from the negative electrode;
a separator positioned between the negative electrode and the positive electrode; and
a moderator layer positioned between the negative electrode and the separator, wherein the entire moderator layer does not include a material which functions as an electronically conducting material at both (i) the potential of lithium and (ii) at potentials higher than the potential of lithium.

9. The electrochemical cell of claim 8, wherein the moderator layer includes a form of lithium.

10. The electrochemical cell of claim 9, wherein the moderator layer includes $Li_{4+x}Ti_5O_{12}$, wherein X> about 0.1 during normal charge and discharge of the electrochemical cell.

11. The electrochemical cell of claim 8, wherein the positive electrode includes a form of sulfur.

12. The electrochemical cell of claim 11, wherein the moderator layer includes $Li_{4+x}Ti_5O_{12}$, wherein X> about 0.1 during normal charge and discharge of the electrochemical cell.

13. The electrochemical cell of claim 1, wherein the moderator layer is a dense lithium titanate layer.

14. The electrochemical cell of claim 13, wherein the moderator layer is formed by atomic layer deposition.

15. The electrochemical cell of claim 6, wherein the moderator layer is formed as a dense lithium titanate layer.

16. The electrochemical cell of claim 15, wherein the moderator layer is formed by atomic layer deposition.

17. The electrochemical cell of claim 8, wherein the moderator layer is formed as a dense lithium titanate layer.

18. The electrochemical cell of claim 17, wherein the moderator layer is formed by atomic layer deposition.

* * * * *